United States Patent [19]
Laughlin et al.

[11] Patent Number: 5,858,440
[45] Date of Patent: Jan. 12, 1999

[54] METHOD OF PREPARING DOUGH

[75] Inventors: Daniel L. Laughlin, White Bear Lake; Jimmy A. DeMars, Hugo, both of Minn.

[73] Assignee: The Pillsbury Company, Minneapolis, Minn.

[21] Appl. No.: 723,863

[22] Filed: Sep. 30, 1996

[51] Int. Cl.$^6$ ................................ A21D 10/02

[52] U.S. Cl. .................. 426/549; 426/94; 426/496; 426/551; 426/552

[58] Field of Search ............... 426/549, 551, 426/552, 561, 562, 563, 94, 496

[56] References Cited

U.S. PATENT DOCUMENTS

| | | | |
|---|---|---|---|
| 3,620,763 | 11/1971 | Hans . | |
| 4,022,917 | 5/1977 | Selenke . | |
| 4,381,315 | 4/1983 | Yong et al. | 426/128 |
| 4,741,907 | 5/1988 | Furuhashi | 426/128 |
| 4,792,456 | 12/1988 | Katz et al. | 426/128 |
| 5,260,082 | 11/1993 | DelValle et al. . | |
| 5,409,720 | 4/1995 | Kent et al. . | |
| 5,451,417 | 9/1995 | Freyn et al. | 426/551 |

OTHER PUBLICATIONS

R. Carl Hoseney, "Principles of Cereal Science and Technology, Second Edition", Published by *The American Association of Cereal Chemists, Inc.*, St. Paul, Minnesota, USA, pp. 221–224 and 250–251 (1986/1994).

*Primary Examiner*—Lien Tran
*Attorney, Agent, or Firm*—Merchant, Gould, Smith, Edell, Welter & Schmidt, P.A.

[57] ABSTRACT

A method of preparing a dough composition. According to the method, a first batter comprising water and a leavening acid is formed. A second batter comprising water and a leavening base is also formed. After each batter is formed separately, the first and second batters are combined to formulate a dough wherein said dough proofs rapidly and provides a higher specific volume upon baking. A dough composition is formulated from two separate batters, a first batter comprising water and a leavening acid, and a second batter comprising water and a leavening base. When the two batters are combined, with flour, the resulting dough comprises from about 30 wt-% to about 60 wt-% flour; from about 20 wt-% to about 40 wt-% water; from about 0.1 wt-% to about 2.0 wt-% leavening acid; from about 0.1 wt-% to about 2.0 wt-% leavening acid. The dough proofs rapidly and, once baked, provides a specific volume ranging from about 2 cc/g to 5 cc/g.

20 Claims, 2 Drawing Sheets

5,858,440

METHOD OF PREPARING DOUGH

FIELD OF THE INVENTION

This invention relates generally to a method of preparing dough. More particularly, this invention provides a method for making a dough wherein two batters are separately formulated, each containing a separate leavening constituent, and then further mixed to provide a dough which has superior proofing and packaging capabilities as well as a higher specific volume in the finished baked good. The invention is applicable to packaged refrigerated dough and, in particular, canned refrigerated dough products.

BACKGROUND OF THE INVENTION

In commercial baking, batters and doughs are often formulated by the hundred, if not the thousands of pounds. As with any food product, doughs and the resulting baked goods have organoleptic properties which are based upon the dough formula, thorough mixing, uniform distribution of dough components, and uniformity of physical properties within the dough. Uneven or a lack of full mixing may affect taste, texture, and mouthfeel of the dough. Nonuniform dough mixing may also result in a variance in dough can pressure and, in turn, decreased shelf stability, and reduced processability of the eventual baked good.

Another problem faced in the production or formulation of a dough is that the viscoelastic properties of the dough change as the dough continues to develop and build viscosity. Minor ingredients or constituents which are placed into the dough in smaller concentrations often have important roles in contributing organoleptic properties to the dough. However, these same constituents are often the most difficult to mix homogeneously within the developing dough.

For example, leavening is critical in refrigerated doughs. The type, quantity, and combination of leavening agent is tailored to each product to give optimum volume, texture, performance and quality.

Typically doughs are prepared by mixing flour, water and dough-developing agents in a first cycle. Minor ingredients, including leavening agents, are added to the developing dough in a second cycle. The first cycle is generally intended to provide a peak viscosity and is generally the longest period in dough mixing. With large volumes of dough, the development of a peak viscosity is important to the commercial production of large volumes of doughs and baked goods.

In order to maintain the efficiency of the dough formulation process, the second cycle takes place over a relatively shorter period of time. As a result, minor ingredients such as leaveners, flavors and nutrients may be mixed throughout the dough in a manner which is less than homogenous. As a result, the dough may have uneven concentrations of leavener dispersed throughout the dough matrix.

Problems which may occur when the dough ingredients are not thoroughly mixed include less than adequate proofing and low specific volumes in final baked goods. Commercial doughs are typically packaged, for example, in cans, so the lack of uniform mixing can result in some cans having too much leavening, and therefore an excessively high can pressure, and other cans having too little leavening, and therefore an excessively low can pressure. If the can pressure is too high, the cans might burst, leading to unusable product. If the can pressure is too low, the dough might not be shelf stable and might spoil because there was insufficient pressure to expel all of the oxygen from the can. A non-uniform distribution of ingredients might also result in non-uniform final products or a final product with a lower specific volume.

To insure the even distribution of ingredients within the dough, a manufacturer may have to extend the amount of time the ingredients are mixed. This can result in an increased production time, decreased output capacity and therefore decreased manufacturing efficiency.

Prior disclosures concerning dough formulations include U.S. Pat. No. 3,620,763 to Hans which is directed to a ready-to-bake refrigerator dough which exhibits stability against microbial growth. Hans teaches the addition of polysaccharide hydrophilic film formers to a dough to enhance storage stability. However, Hans does not disclose a method to enhance the uniformity of the ingredients within the dough.

U.S. Pat. No. 4,022,917 to Selenke teaches maintaining the premixed batter at an acidic pH of about 5 or less to inhibit microbial growth by isolating the acidified batter from the alkaline leavening ingredients of the mixture. To isolate the alkaline leavening agent from the acidified batter, the alkaline leavening agent is encapsulated within a water-insoluble coating that is meltable or heat-dispersible. The coating prevents the alkaline leavening agent from reacting with the acidic leavening agent in the batter until the batter is cooked. An acidic environment inhibits bacterial growth and can enhance the activity of some fungistatic agents. Selenke does not teach a method to enhance the uniformity of ingredients within a dough.

U.S. Pat. No. 5,409,720 to Kent et al. teaches a dough mix including a moist ingredient portion and a dry ingredient portion capable of being combined to produce a complete dough requiring no additional ingredients. The moist ingredient portion includes sugar, shortening and all water or moisture required in the complete dough. The dry ingredient portion includes all flour required in the complete dough and may include leavening agents, egg solids, candy pieces, nuts, dried fruits, coconuts and other dry or moisture-free ingredients. Kent is directed to a method for enhancing the shelf stability of a dough mix, not a method for enhancing the uniformity of ingredients within a dough.

None of these known methods insure that the dough product will have an adequately mixed leavening system. As a result, the products produced by the methods described above may not be uniform. Because it is important that manufacturers of dough products be able to make the products efficiently while producing the best product possible, there is a need for an inexpensive, efficient method of making dough that will result in a uniform product.

SUMMARY OF THE INVENTION

The claimed invention teaches a method for preparing a dough composition by forming a first batter comprising water, leavening acid and, optionally, minor ingredients and forming a second batter comprising water, leavening base, and, optionally, flour. Since two batters are formed, the method may be referred to as a "double-batter-mixing" method. After the first and second batters are mixed separately, the first and second batters are combined to formulate a dough wherein the dough may proof rapidly and provide a higher specific volume than conventional methods upon baking.

The dough composition of the invention is formulated from two separate batters. The first batter comprises water, a leavening acid and optional minor ingredients. The second batter comprises water, a leavening base, and may contain flour. Once the two batters are combined together with any additional ingredients, the resulting dough comprises from about 30 wt-% to about 60 wt-% flour; from about 20 wt-% water to about 40 wt-% water; from about 0.1 wt-% to about 2.0 wt-% leavening acid; and from about 0.1 wt-% to about 2.0 wt-% leavening base. The dough composition may be proofed for about 0 to about 90 minutes and the final baked product preferably has a specific volume of about 2 cc/g to about 5 cc/g.

The invention allows production of doughs which afford faster proofing, when packaged provide a narrower range of package pressures, and provide baked goods which have higher specific volumes. Further, by introduction of minor, yet important ingredients, such as leaveners, at an earlier stage in the mixing process, the invention provides a method for formulating doughs which increases efficiency by up to 10% or more in a given time period. The claimed invention is applicable to any number of dough compositions. Generally, the invention is applicable to any dough systems containing chemical leavening. Representative but not limiting dough products include biscuits, rolls, bread sticks, pizza crusts, and laminated pastries among other goods.

One aspect of the claimed invention is a method for preparing dough, wherein the leavening agents are mixed uniformly throughout the dough. The uniform distribution of leavening agents can be observed by measuring dough package pressure distribution over time.

When leavened doughs are packaged in, for example, dough cans and then refrigerated, the leavening reaction continues to generate gas within the dough inside the can. Depending on the amount and distribution of the leavening agents, if the dough has sufficient leavening capacity, it desirably expands to fill the volume of the container. After the container volume is filled, and again, if the dough has sufficient leavening capacity, the dough desirably continues to expand to generate pressure within the container. If there is too high a concentration of leavening agents in the dough in a given can, the dough will expand too much and cause the can to burst.

If, on the other hand, the concentration of leavening agents in the dough in a given can is too low, the dough will not expand sufficiently to drive out all of the oxygen and seal the can. This permits the oxygen in the container to adversely interact with the dough, resulting in, among other things, gray dough and microbial growth. Therefore, it is important that every batch of dough be mixed to have a sufficiently uniform leavening concentration distributed throughout the dough matrix to achieve the desired level of dough expansion in each can.

As seen in the Figures, in conventionally prepared doughs, the leavening agents may not be distributed uniformly throughout the batch of dough, resulting in wide variations in the concentration of leavening agents in each can. As a result, there can be a wide distribution of can pressure ranges for any given batch. Some of these cans will contain doughs that generate too much pressure, and some will contain doughs that do not generate sufficient pressure to provide the desired packaged dough product.

Doughs made using the method of the invention show a narrower can pressure distribution over time. This is achieved by more uniformly distributing the leavening agents in the batch of dough, so that the chances are greatly increased that the dough will have nearly the target leavening agent concentration in each can. In addition, the narrow can pressure distribution means that the overall leavening agent concentration in the dough can be tailored to the specific type of leavening agent used, giving the manufacturer a greater degree of control of the properties, including can pressures, of the manufactured product. Because the can pressure distribution is narrower, the number of cans with insufficient gas expansion or excessive gas expansion is reduced, resulting in fewer non-specification product losses and hence a greater efficiency for the entire manufacturing process.

The method also results in faster processing times because the ingredients are more easily combined and the dough can be proofed for a shorter period of time. Additionally, the method results in products with increased specific volume, increased bake height and a more uniform crumb texture. According to the claimed invention, a leavening base is combined with water to form a base batter and a leavening acid is combined with water to form an acid batter. Approximately half of the water in the recipe is used in the base batter, and the other half, in the acid batter. A small amount of water (0 to 5 wt-%) may optionally be reserved and added to the dough during the mix cycle to adjust the viscoelastic properties of the dough, as desired. Each batter may also contain selected minor ingredients or a portion of the flour.

Because the two batters each contain a higher percentage of water than a typical dough formulation, the batters are less viscous. The reduced viscosity helps insure that the ingredients present in the batter, in particular, the leavening agents, are thoroughly mixed. Because a single batter contains either the leavening base or leavening acid, the actual chemical leavening reaction cannot begin until both batters are combined. As a result, the leavening agents can be thoroughly combined with the other minor ingredients present in their respective batter before exposure to the other leavening agent. Consequently, when the batters are combined, the leavening reaction occurs more rapidly than in conventional dough mixing and occurs uniformly throughout the dough. The reduced viscosity of the batters and the separation of the leavening agents both help insure that the ingredients in the dough are more thoroughly and more easily combined. As a result, dough mixing times and output capacity are improved and the final product has a more uniform texture and a higher specific volume.

DETAILED DESCRIPTION OF THE INVENTION

The invention relates to refrigerated dough compositions made using a double-batter-mixing procedure. In a first batter, a leavening acid and water are combined to form an acid batter. In a second batter, a leavening base and water are combined to form a base batter. In a preferred embodiment, the base batter contains minor ingredients that are required for dough development such as flour and dough-developing agents along with the water and leavening base. In the preferred embodiment, the acid batter contains ionic ingredients that might interfere with dough development in addition to the water and leavening acid. After both the base batter and the acid batter are mixed separately, the two batters are combined and mixed with additional ingredients such as flour or shortening to form a dough.

The double-batter-mixing procedure of the invention results in a dough in which minor ingredients, such as leavening agents, are nearly uniformly distributed throughout the dough. Consequently, the dough is able to proof faster and provide baked goods which have a higher specific volume. Additionally, the dough, when packaged in, for example, cans, has a narrower range of can pressures at refrigeration temperature. As used with the invention "refrigeration temperature" means a temperature that is above the freezing point of water, but cool enough to reduce microbial growth. Typically, a "refrigeration temperature" is between about 35° F. and 45° F., more preferably between about 35° F. and 40° F.

Composition

The invention can be used to make a variety of refrigerated doughs including doughs for breads, such as French bread, wheat bread, white bread, corn bread, rolls, such as cinnamon rolls, dinner rolls, caramel rolls and other assorted baked goods such as breadsticks, croissants, pastries, biscuits, pizza dough, and the like. Additionally, the invention can be used to make non-refrigerated doughs, such as doughs that are immediately baked or doughs made from dry mixes wherein the dry ingredients for the base batter and the acid batter are contained in separate packages that are first mixed with water to make separate batters which are later combined to form a dough.

A. Flour

The dough of the invention contains a grain constituent that contributes to the structure of the dough. Different grain constituents lend different texture, taste and appearance to a baked good. Flour is a grain constituent that is frequently used in baked goods. Suitable flours include hard wheat flour, soft wheat flour, corn flour, high amylose flour, low amylose flour, and the like. For example, a dough product made with a hard wheat flour will have a more coarse texture than a dough made with a soft wheat flour due to the presence of a higher amount of gluten in hard wheat flour.

B. Leavening Agents

The doughs of the invention include chemical leavening agents that increase the volume and alter the texture of the final baked good. Chemical leavening typically involves the interaction of a leavening acid and bicarbonate of soda or sodium bicarbonate, a leavening base. The leavening acid triggers the release of carbon dioxide from bicarbonate upon contact with moisture. The carbon dioxide gas aerates a dough or batter during mixing and baking to provide a light, porous cell structure, fine grain, and a texture with desirable appearance and palatability.

The evolution of carbon dioxide essentially follows the stoichiometry of typical acid-base reaction. The amount of bicarbonate present determines the amount of carbon dioxide evolved, whereas the type of leavening acid affects the speed at which the carbon dioxide is liberated. The amount of leavening base used in combination with the leavening acid should be balanced such that a minimum of unchanged reactants remain in the finished product. An excess amount of leavening base can impart a bitter flavor to the final product while remaining leavening acid can make the baked product tart.

Sodium bicarbonate, or baking soda, is a leavening base that is the primary source of carbon dioxide gas in many chemical leavening systems. This compound is stable and relatively inexpensive to produce. Baking soda can be used in either an encapsulated form or in a non-encapsulated form. The use of an encapsulated baking soda delays the onset of the leavening reaction as the encapsulating material must first be dissolved before the leavening reaction can occur. Other leavening bases include potassium bicarbonate, ammonium carbonate and ammonium bicarbonate.

Leavening acids include sodium or calcium salts of ortho, pyro, and complex phosphoric acids in which at least two active hydrogen ions are attached to the molecule. Baking acids include monocalcium phosphate monohydrate (MCP), monocalcium phosphate anhydrous (AMCP), sodium acid pyrophosphate (SAPP), sodium aluminum phosphate (SALP), dicalcium phosphate dihydrate (DPD), dicalcium phosphate (DCP), sodium aluminum sulfate (SAS), glucono-delta-lactone (GDL), potassium hydrogen tartrate (cream of tartar) and the like.

In addition to the chemical leavenings described above, the doughs of the invention may also include other leavening agents such as yeast.

C. Additional Ingredients

The dough of the invention may contain agents that modify the texture of the dough. Texture modifying agents can improve viscoelastic properties, plasticity, dough development, and the like. Examples of textural agents include fats, emulsifiers, hydrocolloids, and the like.

Fat is frequently added to a dough formulation as a shortening that entraps air during the creaming process. Consequently, shortening helps improve the volume, grain and texture of the final product. Shortening also has a tenderizing effect and improves overall palatability and flavor of a baked good. Either natural shortenings, animal or vegetable, or synthetic shortenings can be used. Generally, shortening is comprised of triglycerides, fats and fatty oils made predominantly of triesters of glycerol with fatty acids. Fats and fatty oils useful in producing shortening include cotton seed oil, ground nut oil, soybean oil, sunflower oil, rapeseed oil, sesame oil, olive oil, corn oil, safflower oil, palm oil, palm kernel oil, coconut oil, and combinations thereof.

Emulsifiers are nonionic, anionic, and/or cationic surfactants that influence the texture and homogeneity of the dough mixture, increase dough stability, improve eating quality, and prolong palatability. Emulsifiers include lecithin, mono- and diglycerides of fatty acids, propylene glycol mono- and diesters of fatty acids, glyceryl-lacto esters of fatty acids, ethoxylated mono- and diglycerides, and the like.

Hydrocolloids are added to the dough formulation to increase moisture content, and to improve viscoelastic properties of the dough and crumb texture of the final product by stabilizing small air cells within the batter and binding to moisture. Hydrocolloids include xanthan gum, guar gum, locust bean gum, and the like.

Dough-developing agents may also be added to the system to increase dough viscosity, texture and plasticity. Any number of agents known to those of skill in the art may be used including azodicarbonamide, diacetyl tartaric acid ester of mono- and diglycerides (D.A.T.E.M.) and potassium sorbate.

Doughs also frequently contain nutritional supplements such as vitamins, minerals, proteins, and the like. Examples of nutritional supplements include thiamin, riboflavin, niacin, iron, calcium, and mixtures thereof.

Doughs can also include flavorings such as sweeteners, and spices and specific flavorings such as bread flavoring. Sweeteners include regular and high fructose corn syrup, sucrose (cane or beet sugar), dextrose, and the like. In addition to flavoring the baked good, sweeteners such as sugar increase the moisture retention of a baked good, thereby increasing its tenderness.

Doughs can also include preservatives and mold inhibitors such as sodium salts of propionic or sorbic acids, sodium diacetate, vinegar, monocalcium phosphate, lactic acid and mixtures thereof.

Representative constituent concentrations may be found in Table 1, provided below.

TABLE 1

| | Dough (wt-%) | |
| --- | --- | --- |
| Constituent | Preferred | More Preferable |
| Flour | 30–60 | 35–55 |
| Water | 20–40 | 25–35 |
| Acid Leavener | 0.1–2.0 | 1.0–1.5 |
| Base Leavener | 0.1–2.0 | 0.75–1.5 |

Formulation

A. The Base Batter

According to the invention, the base batter contains a leavening base and a higher percentage of water than a typical dough formulation. Typically, the batter contains approximately half of the water required in the dough formulation with less than half of the dry ingredients. In addition to water and a leavening base, other minor ingredients required by the dough formulation can be added to the base batter.

Any of the minor ingredients required by the dough formulation (except for the leavening acid) can be added to the base batter and the double-batter-mixing method will still enhance the quality of the final product. However, to enhance dough development and optimize the double-batter-mixing process by further decreasing mixing times and improving the dough viscoelasticity, it is preferred that the base batter contain only ingredients that are needed for dough development such as flour and dough-developing agents in addition to water and the leavening base. The amount and type of ingredients in the base batter will vary depending on the type of dough product that is being made. For example, a dough formulation for a loaf of French bread might have different ingredients than a dough formulation for a buttermilk biscuit or breadsticks. The difference in the dough formulations can be reflected in the composition of the batters.

Generally, the batter should have enough water present to result in a viscosity low enough such that the ingredients are easily combined, but a high enough such that at least some of the air bubbles produced by mixing the batter are trapped within the batter composition. The amount of leavening agent present in the dough varies with the desired can pressure. However, there should be enough leavening to generate a sufficient can pressure to prevent gray dough, but not so much that the cans burst. Because the leavening agents are uniformly mixed according to the method of the invention, a lower amount of leavening can be added to the dough composition than in a typical dough formulation while obtaining similar desirable organoleptic qualities.

Preferably, the base batter comprises from about 2 wt-% to about 6 wt-% leavening base. More preferably, the base batter comprises from about 3 wt-% to about 5 wt-% leavening base. Typically, the base batter contains from about 40 wt-% to about 95 wt-% water, from about 10 wt-% to about 40 wt-% flour, from about 2 wt-% to about 6 wt-% leavening base and from about 0.01 wt-% to about 0.2 wt-% of a dough-developing agent. More preferably, the base batter contains from about 50 wt-% water to about 70 wt-% water, from about 15 wt-% to about 35 wt-% flour, from about 3 wt-% to about 5 wt-% leavening base and from about 0.05 wt-% to about 0.1 wt-% of a dough-developing agent.

The base batter is typically prepared by first combining water with ice to make an ice-water mixture. The leavening base and minor ingredients, such as flour and dough-developing agents can added individually to the ice-water mixture or the ingredients can be dry-mixed and then combined with the ice-water mixture. Eventually, during mixing the ice melts in the batter, cooling the entire batter mix and forming a relatively uniform mixture. The purpose of the ice is to simply keep the batter temperature from increasing too much due to the work done on the batter. Other means of keeping the batter temperature from increasing too much, such as a cold water-jacketed mixing vessel or mixing the batter in a cold room, can be used.

If the dough is made in bulk, for example, during industrial production, it is preferred that the batter be mixed at a low temperature such that all the ingredients when combined to form a dough are at a low temperature. It is also desirable that the dough be mixed at a low temperature to prevent the premature action of the leavening agents. If the leavening agents react prematurely during processing there will not be enough gas trapped within the dough to provide adequate expansion after the dough is canned to prevent gray dough. Preferably, the base batter is mixed at a temperature from about 25° F. to about 65° F. More preferably, the base batter is mixed at a temperature from about 32° F. to about 45° F.

The base batter should be mixed for a time effective to thoroughly combine the ingredients. Therefore, it is preferred that the base batter is mixed for about 2 minutes to about 7 minutes, more preferably from about 3 minutes to about 6 minutes.

The time after the base batter is mixed, and before the base batter is combined with the acid batter, is preferably as short as possible within the constraints of the production facility. Typically, the hold time is from about 0 minutes to about 60 minutes, more preferably the hold time is from about 0 minutes to about 30 minutes.

B. The Acid Batter

According to the invention, the acid batter contains a leavening acid and a higher percentage of water than a typical dough formulation such that the ingredients present in the batter are easily combined. It is preferred that the batter contain approximately half of the water required in the dough formulation.

As with the base batter, other minor ingredients required by the dough formulation can be added to the acid batter (except for the leavening base). Again, as with the base batter, any of these minor ingredients can be added to the acid batter and the double-batter-mixing method would still enhance the quality of the final product. However, it is preferred that the acid batter contain ionic ingredients, such as sugar and salt, that could interfere with dough development in the base batter. When combining minor ingredients in either the acid batter or the base batter, it is also important to select minor ingredients such that they will not interfere with the leavening agents' ability to react with each other during dough formation.

Typically, the acid batter contains from about 40 wt-% water to about 95 wt-% water, from about 3 wt-% leavening acid to about 7 wt-% leavening acid, from about 3 wt-% salt to about 7 wt-% salt, and from about 5 wt-% sugar to about 35 wt-% sugar. More preferably, the acid batter contains from about 45 wt-% water to about 65 wt-% water, from about 4 wt-% leavening acid to about 6 wt-% leavening acid, from about 4 wt-% salt to about 6 wt-% salt, and from about 5 wt-% sugar to about 30 wt-% sugar.

The acid batter is typically prepared by first combining water with ice to make an ice-water mixture, but can be kept cool by other methods as described for the base batter. The leavening acid and minor ingredients, such as flavorings, salt, sugar, shortening and flour can be added individually to the water mixture or first dry-mixed and then combined with the ice-water mixture. The acid batter should be mixed for a long enough time to thoroughly combine the ingredients, but not so long that an excessive amount of gas is evolved during the batter mixing process. If too much gas evolves during the acid batter mixing process, the resulting dough will not have enough gas within the dough to expand and to produce enough can pressure to expel the oxygen from the can and prevent the dough from spoiling. Therefore, it is preferred that the acid batter is mixed for about 2 minutes to about 7 minutes, more preferably from about 3 minutes to about 6 minutes.

To prevent premature reaction of the leavening agents before the batters are combined, the acid batter temperature is preferably from about 25° F. to about 65° F., more preferably, from about 32° F. to about 45° F. Because gas is also evolved during the time period after the acid batter is mixed but before the acid batter is combined with the base batter, it is preferable that the "hold time" for the acid batter be from about 0 minutes to about 60 minutes, more preferably, from about 0 minutes to about 45 minutes.

Both the acid batter and the base batter preferably have a low viscosity to facilitate the distribution of the ingredients within the batter. However, both batters should be thick enough to impede the rapid transfer of air and carbon dioxide bubbles out of the batter that are generated due to the action of the mixing or to the reaction of the leavening acid or leavening base with the other batter ingredients. Although the acid or base may slightly react with, for example, the water or flour used to make the batter, the degree of reaction and the amount of gas generated at this stage is very low. Most of the gas generated by an acid-base reaction occurs upon mixing the batters together to make the dough.

Preferably, both batters are as viscous as possible while still achieving the purpose of the invention. The viscosity of a batter varies as a function of temperature. Typically, the viscosity of the batter is from about 400 centipoise (cps) to about 1600 cps when the batter is mixed at a temperature from about 55° F. to about 70° F. More preferably the viscosity of the batter is from about 800 cps to about 1200 cps in this temperature range.

However, in a lower temperature range that is better suited for industrial purposes, the batter might have a different viscosity. In a preferred temperature range for bulk production between 32° f. and 45° F., it is preferred that the batters have a viscosity between about 500 cps and about 2500 cps, more preferably, from about 1000 cps to about 2000 cps. It is also preferable that the acid batter and the base batter have similar viscosities, so that the two batters can be readily combined to make a dough.

C. The Dough

After the base batter and the acid batter are prepared and thoroughly mixed in their separate containers, the two batters are combined with any remaining ingredients during a single "mix cycle" to form a dough. Because the leavening agents have already been combined with some of the minor ingredients in their respective batters, the mix cycle can usually be shorter than the conventional mixing processes. Both of the leavening agents have previously been uniformly distributed in their respective batters. When the batters are subsequently combined, the leavening reaction can take place uniformly throughout the entire dough. The mix cycle should last long enough to insure the dough has the desired viscoelastic properties. Generally, the the longer the dough is mixed during the mix cycle, the more developed the viscoelasticity of the dough. The desired viscoelastic properties will vary depending on the dough processing and the dough product that is being made.

The viscoelastic properties of the dough can be measured by any number of methods that are known in the industry. The water content, temperature, and ingredients used to make the dough all affect the dough's viscoelastic properties. Typically, the most significant factor determining a target dough viscoelasticity is the type of product to be made with the dough. For example, the viscoelastic properties of a biscuit dough is different from the viscoelastic properties of a pastry dough.

One way of measuring dough viscoelastic properties is with a Farinograph instrument, available from C.W. Brabender Company, South Hackensack, N.J. The Farinograph instrument measures a dough's resistance to mixing, which is measured in Brabender Units (B.U.). Doughs made in accordance with the invention preferably have Farinograph measurements within the ranges typical for doughs, between about 600 to 1200 B.U.

In the invention, the batter in which certain ingredients are added can affect the dough's viscoelastic properties. For example, when a dough-developing agent is added to the base batter, the extensibility of the dough is increased because the dough-developing agent is in contact with the flour and water for a longer period of time. Other ingredients, such as hard wheat flour which contains gluten, may affect the extensibility of a dough due to the protein network formed by gluten. The degree of gluten development in the batter will also, therefore, affect the dough's viscoelasticity.

The flour/water ratio of the dough also varies depending on the dough product. Generally, the flour/water ratio is from about 1.6 to about 1.8.

Because the duration of the mix cycle generally affects the viscoelastic properties of the dough, it is preferable that the dough is mixed for about 5 minutes to about 18 minutes, depending on the desired dough viscoelasticity. More preferably, the dough is mixed for about 7 minutes to about 15 minutes. The temperature of the dough should be low enough that the leavening agents do not prematurely react, but not so low that the dough is too difficult to process. If the leavening reaction is complete before the dough is canned, the dough may not generate sufficient can pressure to prevent gray dough. Because the temperature at which the dough is mixed may affect the leavening reaction, it is preferred that the dough is mixed at a temperature from about 50° F. to about 80° F., more preferably from about 60° F. to about 70° F.

The leavening reaction is generally accelerated through proofing. The proof time of a dough can affect the dough structure and can pressure of a canned, refrigerated dough and the bake height of a baked good. When necessary, it is preferred that the dough is placed in the can and proofed from about 0 minutes to about 90 minutes, more preferably, from about 0 minutes to about 60 minutes. The temperature at which the dough is proofed can also affect the rate of the leavening reaction. Therefore, it is preferred that the proofing is performed at a temperature from about 70° F. to about 110° F., more preferably, from about 80° F. to about 100° F. However, as a result of the invention, the leaveners are so well mixed that proofing may not always be necessary.

According to the invention, it is preferred that the dough mixture contain from about 20 wt-% to 40 wt % water, from about 30 wt-% to 60 wt-% flour, from about 0.1 wt-% to 2.0 wt-% leavening base and from about 0.1 wt-% to about 2.0 wt-% leavening acid. More preferably, the dough mixture contains from about 25 wt-% to about 35 wt-% water, from about 35 wt-% to about 55 wt-% flour, from about 0.75 wt-% to about 1.5 wt-% leavening base and from about 1.0 wt-% to about 1.5 wt-% leavening acid.

The method of the claimed invention results in a more uniform distribution of ingredients within the dough. Formation of a dough using a double-batter-mixing method, from batter formation through final mixing, can be accomplished in about 10 to about 20 minutes. Additionally, the uniformity of ingredients within the dough formulation results in a narrower can pressure distribution. The standard deviation for the can pressures is typically about half that observed with conventional mixing.

After the dough is made, it is processed. Processing will vary depending on the final product. For example, processing for pastry dough will be different than processing for biscuit dough. For commercial products, the dough is formed into the desired size and shape, then placed into cans which are sealed and may be proofed. The proofed cans are then refrigerated and ready for sale.

D. The Baked Good

The method of the claimed invention results in a dough with uniformly distributed ingredients. Because the ingredients are more uniformly distributed, the resulting baked good has a higher specific volume, increased bake height and a more uniform crumb texture when compared to a baked good made by a conventional method. Although described herein as "baked products or goods," doughs of the invention can be made into finished products using other cooking methods such as frying, boiling or microwaving.

Although the specific volume of the baked good varies depending on the type of baked good, the method of the invention results in a baked good with a specific volume from about 5 to about 10% greater than that achieved with conventional mixing. More preferably, the specific volume is from about 3 cc/g to about 5 cc/g.

WORKING EXAMPLES

The following examples further illustrate, but do not limit, the invention.

Example 1

Two batches of dough were prepared: a control biscuit dough, and a double-batter-mixed biscuit dough.

Dough Made By Control Mixing Method

| Ingredient | Wt-% |
|---|---|
| First Cycle Ingredients: | |
| Water & Ice | 28.64 |
| Shortening | 2.00 |
| Flour | 45.14 |
| Minor/Added Ingredients | 3.81 |

-continued

Dough Made By Control Mixing Method

| Ingredient | Wt-% |
|---|---|
| Second Cycle Ingredients: | |
| SAPP and SALP | 1.26 |
| Sodium bicarbonate | 0.95 |
| Salt | 1.2 |
| Sugar | 3.0 |
| Shortening Chips | 14.0 |
| Total | 100.0 |

1st Mix Cycle

An ice-water mixture was made. The flour and minor ingredients were dry-mixed by hand and then poured into the mixer. Melted shortening was stirred into the ice-water by hand and then poured into the mixer. The mixer was run for a total of about 4 minutes.

2nd Mix Cycle

The leaveners including sodium aluminum pyrophosphate (SAPP) and sodium aluminum phosphate (SALP), sodium bicarbonate, sugar, and salt were dry-mixed by hand in a separate vessel. The dry mix was cut into the dough in the mixer by mixing it with fist-sized pieces of dough. Then shortening chips were added to the mixture. The mixer was run for a total 4 minutes in this cycle.

The dough was removed from the mixer and placed in a dough trough. The dough temperature was about 60° F. The flour/water ratio of this dough was 1.58.

Dough Made By Double-Batter-Mixing

| Ingredient | Wt % |
|---|---|
| Acid Batter Ingredients | |
| Water & Ice | 14.25 |
| SAPP and SALP | 1.26 |
| Sugar | 1.5 |
| Salt | 1.2 |
| Shortening | 2.00 |
| Minor Ingredients | 3.81 |
| Base Batter Ingredients | |
| Water & Ice | 14.39 |
| Sodium Bicarbonate | 0.95 |
| Sugar | 1.5 |
| Flour | 9.03 |
| Mix Cycle Ingredients | |
| Flour | 36.11 |
| Shortening Chips | 14.0 |
| Total | 100.0 |

Acid Batter

An ice-water mixture was made. The SAPP, SALP, sugar and some minor ingredients were dry-mixed together by hand and then added to the ice-water. The melted shortening was added to the mixer. The total mixing time for the acid batter was 6 minutes. The temperature of the acid batter was 64° F.

Base Batter

An ice-water mixture was made. The flour was added to the mixer. The sodium bicarbonate and sugar were dry-mixed together by hand and then added to the ice-water. The base batter was mixed for a total of 5 minutes. The temperature of the base batter was 63° F.

Mix Cycle

The hold-time for the acid and base batters was approximately 10–25 minutes before preparing the dough. To prepare the dough, the acid and base batters were poured over flour and shortening chips in the mixer. The mixer was run at high speed (72 RPM) for 6.5 minutes to mix the dough (the "mixing time"). The dough was then removed from the mixer and placed in the dough trough.

The dough temperature was 68° F. The flour/water ratio was 1.58.

Dough Cutting and Canning

The dough from the control batch and the double-batter-mixed batch was formed, canned and proofed. Once sealed, the cans were proofed for 45 minutes. The proofed cans were placed in the refrigerator.

Figure 1A:
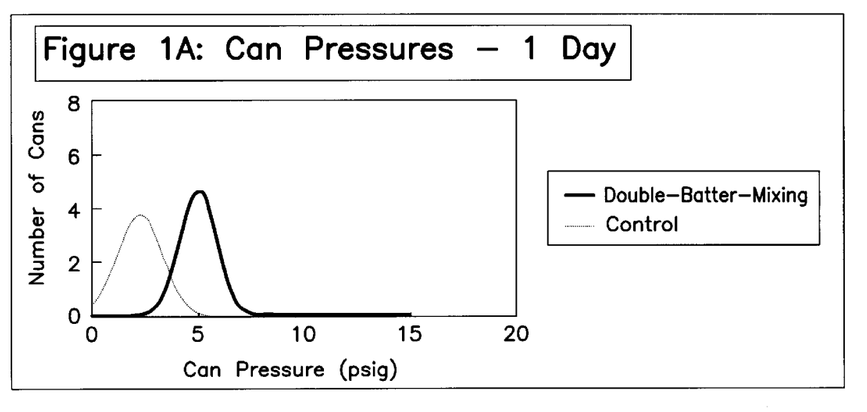
FIG. 1A is a histogram showing the 1 day can pressure of dough made by a double-batter-mixing method and a control dough made by conventional dough mixing procedures.
Figure 1B:
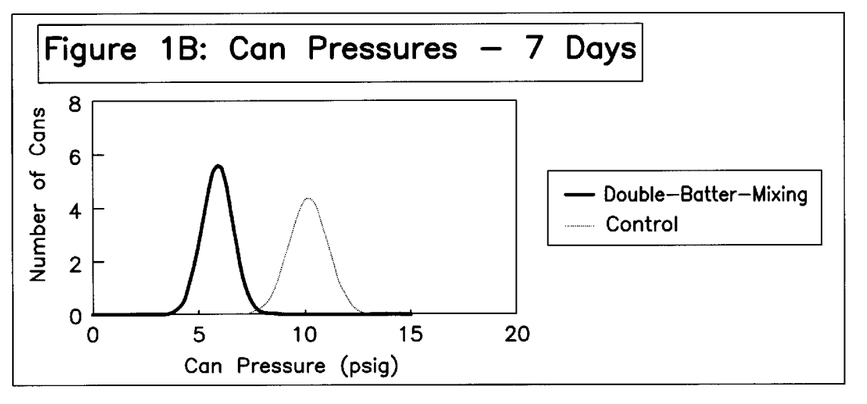
FIG. 1B is a histogram showing the 7 day can pressures of a dough made by a double-batter-mixing method and a control dough.
Figure 1C:
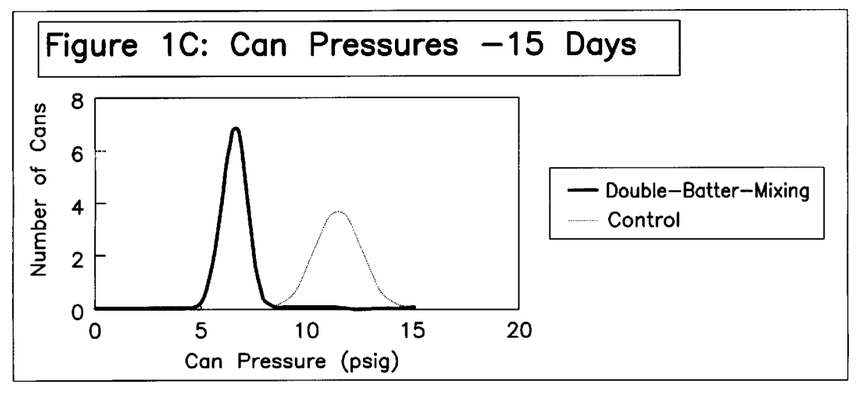
FIG. 1C is a histogram showing the 15 day can pressures of a dough made by a double-batter-mixing method and a control dough.

After 24 hours, the double-batter-mixed dough had can pressures from 3–7 psig. The control dough had can pressures from 0–5 psig. FIG. 1A depicts the distribution of can pressures measured after 1 day. After 7 days, the can pressures increased for dough prepared by both methods. The control dough exhibited the largest pressure increase. FIG. 1B shows the distribution of can pressures measured after 7 days. After 15 days, the control dough cans had an average pressure of 11.4 psig with a standard deviation of +/−1.07 psig. After 15 days, the double-batter-mixed dough cans had an average pressure of 6.6 psig with a standard deviation of +/−0.58 psig. FIG. 1C shows the distribution of can pressures measured after 15 days.

Specific volume measurements were made on 10 biscuits made from dough from each of the double-batter-mixed dough and control dough.

|  | Double-Batter-Mixed Biscuits | Control Biscuits |
| --- | --- | --- |
| Specific Volume (cc/g) (average of 10 biscuits) | 3.20 ±0.11 | 2.94 ±0.007 |

As indicated above, the average specific volume for biscuits made from the double-batter-mixed dough was greater than that of the control dough despite the fact that the double-batter-mixed doughs had significantly lower can pressures. The crumb texture of the double-batter-mixed products was also more uniform than that of the control biscuits. These results are consistent with the result that minor ingredients are better distributed throughout the dough in the double-batter-mixing process.

As seen in FIGS. 1A–C, the cans of double-batter-mixed dough develop most of their pressure in a short time compared to the control dough. After 15 days the double-batter-mixed dough can pressures are only 1–2 psig higher than they were after 24 hours whereas the control dough can pressures increased by up to ten psig. These different rates of developing can pressures are consistent with leavening reaction kinetics. In the double-batter-mixed dough, the reagents are already in solution, and are well-mixed with one another. As a result, the leavening reaction in the double-batter-mixed dough proceeds rapidly.

In the control dough, the leavening ingredients are not entirely in solution as the dough is made. As a result, mass-transfer rates and rates of dissolution of the leavening reagents limit the rate of can-pressure generation in the control dough. This is consistent with the hypotheses that the control dough is not as well-mixed, and that leavening ingredients in the control dough are the least dissolved.

FIGS. 1A–C show that the double-batter-mixed dough cans have a narrower can-pressure distribution than the control dough cans. A narrow can-pressure distribution indicates that the ingredients, especially the leavening agents, are more uniformly distributed throughout the dough.

Example 2

This experiment evaluates the reproducibility of the double-batter-mixing method. Six double-batter-mixed batches and seven control batches were made.

Double-Batter-Mixed Biscuit Dough 2A–F

The ingredients were the same as in Example 1, except for the following percentages as based on the total formula: 13.73 wt-% water & ice mixture was used to make the acid batter and 13.73 wt-% water and ice was used to make the base batter; no potassium sorbate was added to the acid batter; 3.0 wt-% sugar was added to the acid batter; no sugar was added to the base batter; 0.014 wt-% potassium sorbate and 10.36 wt-% flour were added to the base batter; and 0.44 wt-% water, and 36.11 wt-% hard flour were added to the mix cycle.

With minor changes in the mixing times and agitation speed, the acid and base batters for Examples 2A–2F were prepared the same as for the double-batter-mixed batch in Example 1.

The following are the approximate conditions of mixing:

| Acid Batter | Base Batter |
| --- | --- |
| Temperature =0 58–61° F. Mixing time = 5 min Hold time = 14–22 min | Temperature = 59—59° F. Mixing time = 5 min Hold time = 7–20 min |
| Mix Cycle | |
| Dough temperature = 66° F.–72° F. Mixing time = 5 min Can Processing time (mixer to proofer) = 27–36 minutes Proof time = 60 to 90 minutes | |

The flour-to-water ratio for doughs 2A–2F was. 1.75.

Control Biscuit Dough 2G–2M

The ingredients were the same as in the Example 1 control batch, except for the following: 17.005 wt-% water and ice were added to the first cycle ingredients; and 37.89 wt-% flour was added to the first cycle ingredients.

The mixing procedure for biscuits 2G–2M was essentially the same as in the Example 1 control batch.

The flour/water ratio was 1.75 for doughs 2G and 2H and 1.65 for doughs 2I to 2M.

Figure 2:
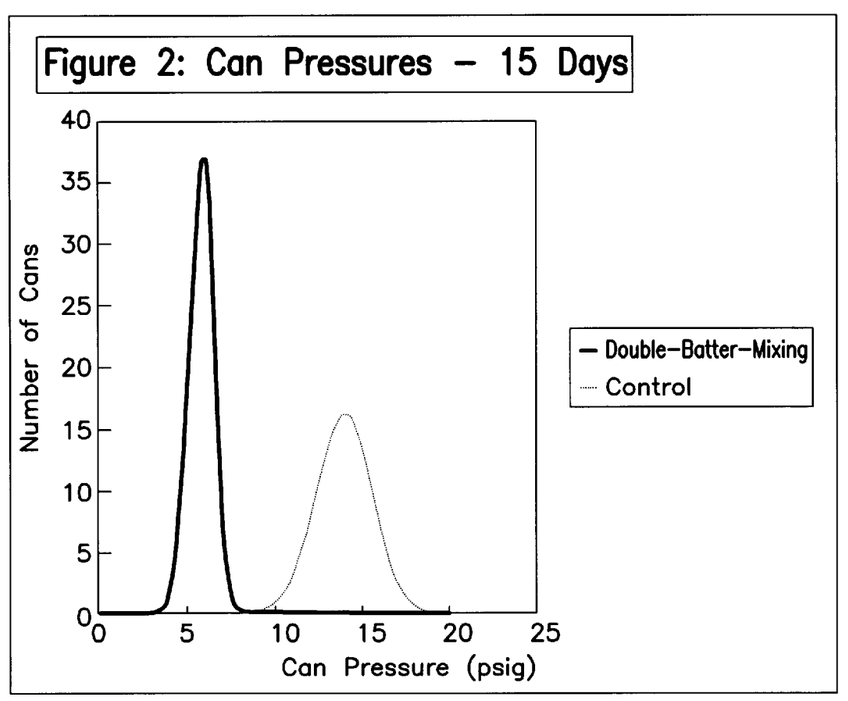
FIG. 2 is a histogram showing the 15 day can pressures for multiple batches of dough made by a double-batter-mixing method and control dough.

A comparison of 15 day pressures for doughs made by the control or double-batter-mixing process of the invention can be seen in FIG. 2. Double-batter-mixed dough cans had an average pressure of 5.7 psig with a standard deviation of +/−0.7 psig. Control-mixed dough cans had an average pressure of 13.9 psig with a standard deviation of 1.6 psig.

A test panel involving 117 test panel members found that the double-batter-mixed biscuits were significantly preferred to the control biscuits (by a 62% to 38% ratio). Despite their lower can pressures, the double-batter-mixed biscuits baked up higher and had higher specific volumes than the control biscuits. The specific volume results and bake-height results of Example 2 are shown below:

| Specific Volume | | |
|---|---|---|
| | Double-Batter-Mixed Biscuits | Control Biscuits |
| Specific Volume (cc/g) (average of approximately 50 biscuits from each batch) | 3.22 +/−0.09 | 3.02 +/−0.18 |

| Bake Heights | | |
|---|---|---|
| | Double-Batter-Mixed Biscuits | Control Biscuits |
| Bake Height (cm for 4 biscuits) | 16.53 +/−0.47 | 15.08 +/−0.52 |

The results of Example 2 clearly show that the double-batter-mixing process results in a narrower can pressure distribution, increased specific volume and increased bake height compared with doughs made by a conventional mixing process.

The above specification, examples and data provide a complete description of the invention. Since many embodiments of the invention are possible without departing from the spirit and scope of the invention, the invention resides in the claims hereinafter appended.

What is claimed is:

1. A method of preparing a dough composition, said method comprising the steps of:
   (a) forming a first batter comprising flour, water and leavening acid;
   (b) forming a second batter comprising flour, water and leavening base;
   (c) combining and mixing said first batter with said second batter and flour to formulate a dough.

2. The method of claim 1, wherein said first batter and second batter each further comprise minor ingredients.

3. The method of claim 2, wherein said minor ingredients are selected from the group consisting of flour, shortening, a flavorant, a dough-developing agent, a nutrient, an emulsifier, a preservative, a hydrocolloid, a salt, sugar and mixtures thereof.

4. The method of claim 1, wherein the first batter comprises from about 40 wt-% water to about 95 wt-% water.

5. The method of claim 1, wherein the second batter comprises from about 40 wt-% water to about 95 wt-% water.

6. The method of claim 1, wherein the leavening acid is selected from the group consisting of sodium aluminum phosphate, sodium acid pyrophosphate, glucono-delta-lactone, monocalcium phosphate anhydrous, monocalcium phosphate monohydrate, dicalcium phosphate dihydrate, dicalcium phosphate, sodium aluminum sulfate, potassium hydrogen tartrate, and combinations thereof.

7. The method of claim 1, wherein the leavening base is selected from the group consisting of sodium bicarbonate, ammonium bicarbonate, potassium bicarbonate, ammonium carbonate, and mixtures thereof.

8. The method of claim 1, wherein the minor ingredients in the first batter includes ionic ingredients.

9. The method of claim 8, wherein said ionic ingredients are selected from the group consisting of salt, sugar, and mixtures thereof.

10. The method of claim 1, wherein said dough is mixed for a period of between about 5 minutes and 18 minutes.

11. The method of claim 1, wherein said second batter comprises dough-developing agents.

12. The method of claim 11, wherein said dough-developing agent is selected from the group consisting of potassium sorbate, azodicarbonamide, diacetyl tartaric acid esters of glycerides, and mixtures thereof.

13. The method of claim 1, further comprising packaging said dough.

14. The method of claim 13, wherein said dough is packaged in a container selected from the group consisting of a can, a tray, a box and a pouch.

15. The method of claim 13, wherein said dough is proofed after being packaged.

16. The method of claim 1, wherein said dough results in a baked good having a specific volume of from about 5 to 10% greater than that achieved with conventional mixing.

17. The method of claim 1, wherein said dough proofs from about 0 minutes to about 90 minutes.

18. The method of claim 17, wherein said proofing is performed at a temperature of from 70° F. to 110° F.

19. The method of claim 1, wherein upon baking said dough, the final baked product preferably has a specific volume of about 2 cc/g to about 5 cc/g.

20. The method of claim 1, wherein said dough proofs rapidly, from about 0 minutes to about 60 minutes at a temperature ranging from about 70° F. to about 110° F., and upon baking said dough the final baked product preferably has a specific volume of about 2 cc/g to about 5 cc/g.

* * * * *